US011486250B2

(12) United States Patent
Abreu et al.

(10) Patent No.: US 11,486,250 B2
(45) Date of Patent: Nov. 1, 2022

(54) METHOD OF ENSURING CONTROLLED FAILURE OF ROCK BOLT BAR

(71) Applicant: EPIROC DRILLING TOOLS AB, Orebro (SE)

(72) Inventors: Rual Abreu, Johannesburg (ZA); Paolo Ettore Pastorino, Johannesburg (ZA); Greig Knox, Johannesburg (ZA)

(73) Assignee: EPIROC DRILLING TOOLS AB, Orebro (SE)

( * ) Notice: Subject to any disclaimer, the term of this patent is extended or adjusted under 35 U.S.C. 154(b) by 0 days.

(21) Appl. No.: 17/052,927

(22) PCT Filed: May 10, 2019

(86) PCT No.: PCT/ZA2019/050026
§ 371 (c)(1),
(2) Date: Nov. 4, 2020

(87) PCT Pub. No.: WO2019/217980
PCT Pub. Date: Nov. 14, 2019

(65) Prior Publication Data
US 2021/0270133 A1   Sep. 2, 2021

(30) Foreign Application Priority Data

May 11, 2018 (ZA) ................................ 2018/03083
Jun. 29, 2018 (ZA) ................................ 2018/04372

(51) Int. Cl.
*E21D 21/00* (2006.01)
*F16B 31/02* (2006.01)

(52) U.S. Cl.
CPC ....... *E21D 21/0026* (2013.01); *E21D 21/008* (2013.01); *F16B 31/021* (2013.01)

(58) Field of Classification Search
CPC ... E21D 21/0026; E21D 21/02; E21D 21/008; F16B 31/021
See application file for complete search history.

(56) References Cited

U.S. PATENT DOCUMENTS 3,967,455 A * 7/1976 Conway .............. E21D 21/0093
   405/288
7,645,096 B2 * 1/2010 Hedrick ............. E21D 21/0033
   405/259.1

(Continued)

FOREIGN PATENT DOCUMENTS

AU            568546      1/1988
AU          2008221612    4/2009

(Continued)

OTHER PUBLICATIONS

International Search Report for PCT/ZA2019/050026 dated Aug. 29, 2019, 5 pages.

(Continued)

*Primary Examiner* — Benjamin F Fiorello
(74) *Attorney, Agent, or Firm* — Nixon & Vanderhye (57) ABSTRACT

Disclosed is a method of adapting a metal bar, for use as a rock bolt, to ensure that the bar will break in a predictable manner, the method including the step of removing material from the bar in a circumferential band to reduce a diameter of the bar within the band to a minor diameter thereby to provide a failure zone within which the bar will break if subjected to enough tensile load.

12 Claims, 7 Drawing Sheets

(56) References Cited

U.S. PATENT DOCUMENTS

| | | | |
|---|---|---|---|
| 10,066,483 B2* | 9/2018 | Evans | E21D 20/003 |
| 10,941,658 B2* | 3/2021 | Pastorino | E21D 21/008 |
| 2010/0021245 A1* | 1/2010 | Li | E21D 21/008 |
| | | | 405/259.5 |
| 2010/0028088 A1* | 2/2010 | Gaudry | E21D 21/0033 |
| | | | 405/259.2 |
| 2013/0028667 A1* | 1/2013 | Champaigne | F16B 13/141 |
| | | | 405/259.5 |
| 2013/0202364 A1* | 8/2013 | Ikuno | F16B 13/066 |
| | | | 405/259.3 |
| 2018/0016900 A1* | 1/2018 | Ma | E21D 20/026 |
| 2019/0376388 A1* | 12/2019 | Hosp | E21D 21/0046 |

FOREIGN PATENT DOCUMENTS

| | | |
|---|---|---|
| FR | 2 559 207 | 8/1985 |
| WO | 2018/209365 | 11/2018 |

OTHER PUBLICATIONS

Written Opinion of the ISA for PCT/ZA2019/050026 dated Aug. 29, 2019, 5 pages.

* cited by examiner

METHOD OF ENSURING CONTROLLED FAILURE OF ROCK BOLT BAR

CROSS-REFERENCE TO RELATED APPLICATION

This application is the U.S. national phase of International Application No. PCT/ZA2019/050026 filed May 10, 2019 which designated the U.S. and claims priority to ZA Patent Application No. 2018/03083 filed May 11, 2018 and ZA Patent Application No. 2018/04372 filed Jun. 29, 2018, the entire contents of each of which are hereby incorporated by reference.

BACKGROUND OF THE INVENTION

The invention relates to a method of ensuring controlled failure of a rock bolt bar.

When a rock bolt is loaded in installation beyond capacity, it can break with resultant loss of load support. A danger is that a severed proximal section of the rock bolt (hereinafter "bar" and "bolt" are used interchangeably to refer to the steel bolt, rod or bar of the rock bolt) has the propensity to eject from the rock hole in which it is installed due to the rapid release of potential energy.

It is important that, if a rock bolt is to break, that it breaks at a predetermined location on the bar. Controlling where the bar will break is important to the safety solution proposed in South African patent application number 2018/02957, which is herein incorporated by reference.

The specification to 2018/02957 describes forming a notch in the bar to induce bar failure at a specific location distal of a failure arrestor element so as to ensure that the severed or projectile section of the bar is restrained by engagement of the failure arrestor element with the arrestor formation.

It is typical to cold or hot form the notch into the bar. This has the effect of locally work hardening the steel of the bar. The problem with this is that the support properties of a rock bolt rely on the inherent ability of the steel bolt to stretch when loaded, absorbing energy and controlling dynamic or quasi-static movement of the rock surrounding the bolt in installation. Cold forming or rolling of the bar when creating a notch can result in localised work hardening which alters the material properties of the steel. This change in the material properties in turn alters the performance of the rock bolt.

The present invention at least partially addresses the aforementioned problem.

SUMMARY OF INVENTION

The invention provides a method of adapting a metal bar, for use as a rock bolt, to ensure that the bar will break in a predictable manner, the method including the step of removing material from the bar in a circumferential band to reduce a diameter of the bar within the band to a minor diameter thereby to provide a failure zone within which the bar will break if subjected to enough tensile load.

The zone may have a length in a range 10 mm to 45 mm. Preferably the zone has a length in a range 25 mm to 35 mm. More preferably, the range is 30 mm to 35 mm.

The failure zone may have a minor diameter which is less 0.5% to 5% of the diameter of the bar. Preferably the minor diameter is less 1% to 4% of the diameter of the bar. More preferably, the minor diameter is less 2% to 3% of the diameter of the bar.

The material is removed in such a manner as to ensure that the minor diameter is consistent within the band.

Preferably, the diameter of the bar is in the range 16 mm to 25 mm.

The material may be removed by any suitable method subtractive manufacturing process, for example by machining or grinding.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention is described with reference to the following drawings in which.

DESCRIPTION OF PREFERRED EMBODIMENTS

Figure 1:
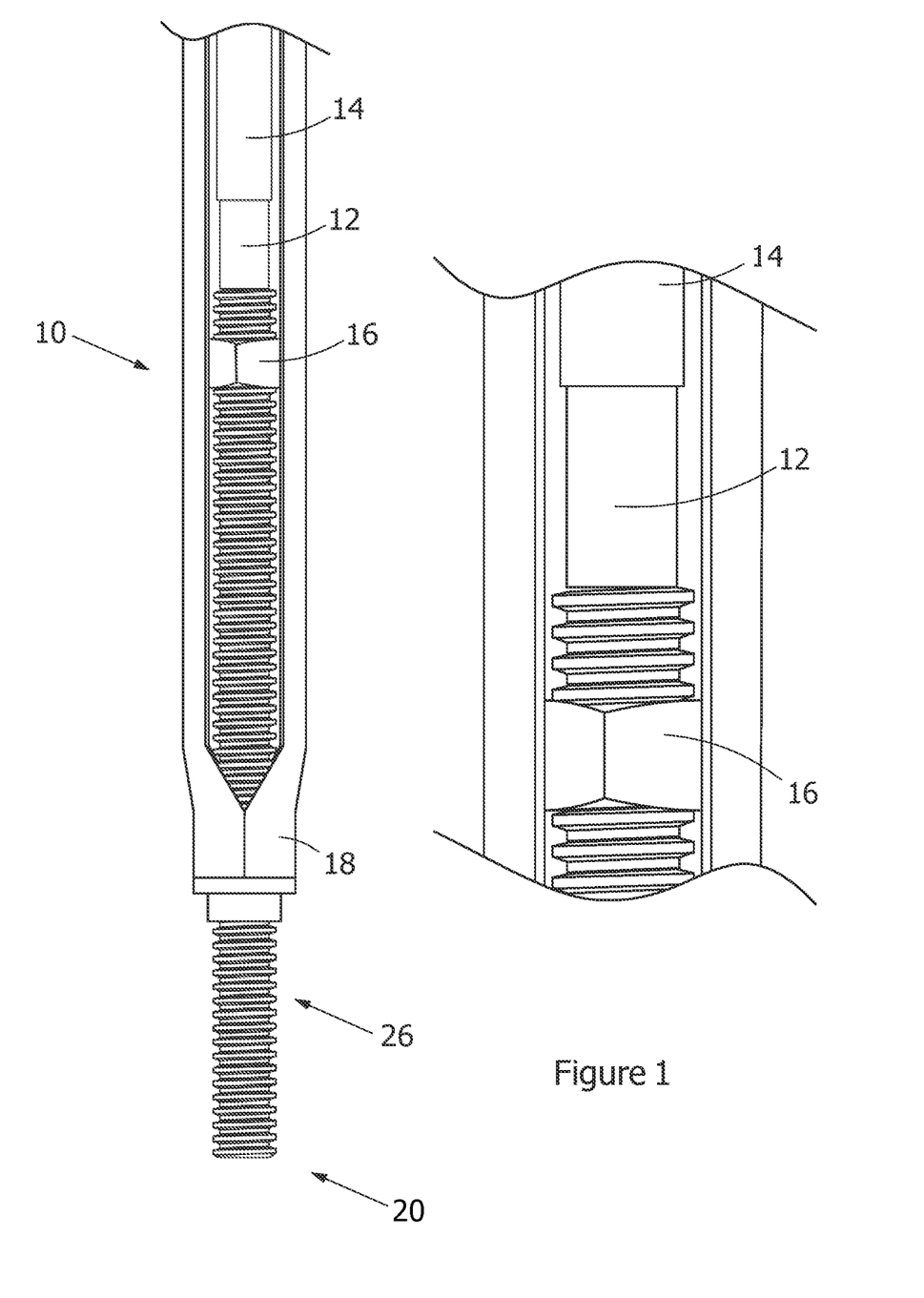
FIG. 1 is a view in elevation of a leading end portion of a rock bolt assembly with a failure zone provided in accordance with the method of the invention.

FIG. 1 illustrates a rock bolt assembly 10 which is an example of the application of a failure zone or notch 12 to a rock bolt bar 14 to provide a solution to the problem described above. This example is not limiting on the invention and it is envisaged that there are further applications to a rock bolt having such a notch.

For an arrestor formation 16 to engage a swaged section of a sleeve 18, to prevent a proximal end section 20 of the bar 14 from ejecting from a rock hole (not shown) in which the assembly 10 is installed, the bar must break ahead of the formation. If a break occurs between the formation and the proximal end section, nothing will arrest this ejectment.

The bar is likely to break as the tensile load to which it is subjected to in use leads up to its maximum load capacity. To provide predictability as to where on the bar 14 the break will occur, the notch 12 is provided at a predetermined position along the length of the bar. The notch provides this break locality predictability.

However, if the notch is to provide this predictability, the notch must be designed so that the bar is certain to break within the confines of the notch each and every time. At the same time, the notch cannot have a material impact on the ability of the bar to provide its load bearing function.

Figure 2:
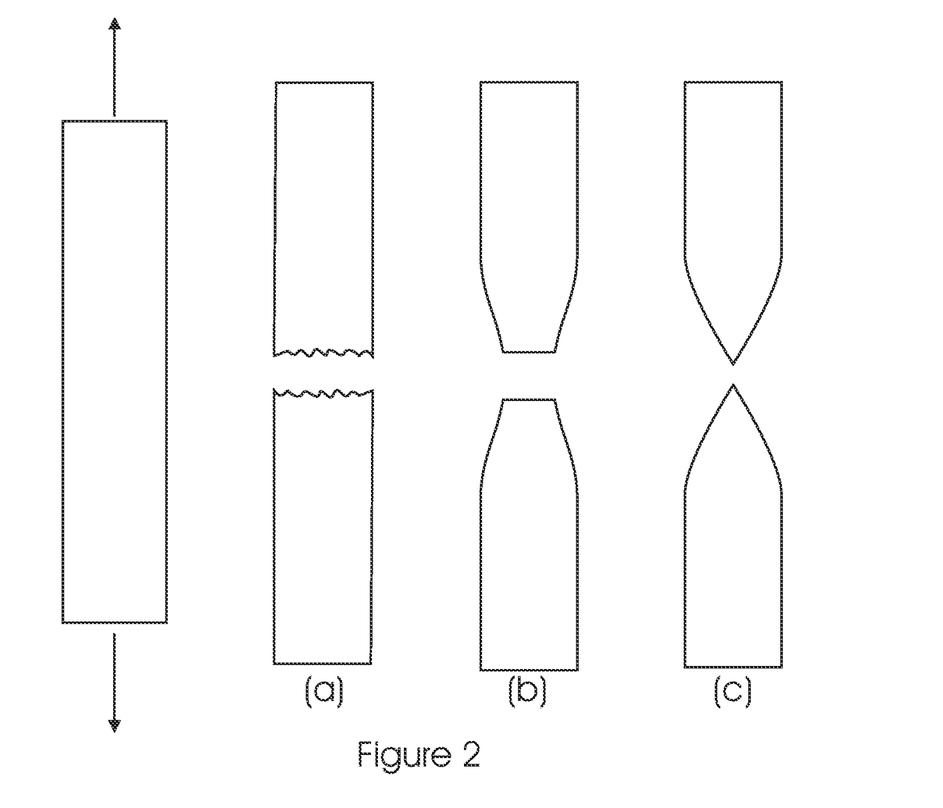
FIG. 2 is a series of diagrams of a length of bar illustrating the bar breaking with (a) a brittle fracture pattern, and (b) and (c) a ductile fracture pattern.

The notch, as a zone weakness relative to the rest of the bar, limits the inherent potential of the bar to provide support up to a particular load which, hitherto, would be a factor of the constituent steel material and the diameter. If the notch is hot or cold formed, hardening of the steel in the locality of the notch, due to changes in material properties, will introduce greater load capacity variance to this limitation. The steel's crystalline structure is changed due to work hardening to become more brittle. This change in the ductility of the steel is not a regular or predictable change and so, about the formed notch, the bar has a tendency to break relatively suddenly, at an unpredictable load, to displaying a brittle fracture pattern as illustrated in (a) of FIG. 2.

The applicant has found that to ensure that a metal bar will break in a predictable manner, i.e. predictable as to the position of the break and the load at which the break occurs, the notch 12 must be made on the bar 14 by employing a subtractive manufacturing process. This process can be, for example, a machining or a grinding process. In other words the notch has to be made by removing material rather than by moving material in a forming or rolling process.

In accordance with the invention, the notch must be machined to recess below the bar surface to a consistent minor diameter (hereinafter minor diameter and notch diameter are used interchangeably to mean the same thing). The minor diameter of the notch can be in a relatively broad range, dependent on the required product specification of the rock bolt to which the bar is applied. The smaller the diameter of the bar at the notch, of course, the less is the ultimate load capacity (UTS) of the bar. The applicant found that by removing material to a minor diameter of only 1% less than the diameter of the bar was enough to achieve regular breaking within the notch without sacrificing on UTS.

However it is found that not only must the notch 12 be machined into the bar 14 but also that the notch must have a length which will allow the formation of an uninterrupted ductile failure neck 22 within the notch area, when the bar is loaded to ultimate capacity. See FIG. 3B which illustrates this ductile fracture neck and (b) and (c) of FIG. 2 which illustrate the ductile fracture shape post break.

Two parameters of the notch, being depth of notch and length of notch, were explored in two series of tests. A discussion of each follows.

Quasi-Static Test

Test samples were subjected to a quasi-static pull test wherein each sample was a 20 mm diameter bar. The samples included a control sample with no notch and three other samples, each having a 30 mm long notch, with a notch or minor diameter of 19.8 mm, 19.5 mm and 19 mm respectively (tolerance of +/−0.03). The samples were prepared in triplicate. Each notch was machined into the bar at its centre. Each bar thereafter was prepared before being pull tested in a tensile test machine.

Figure 4:
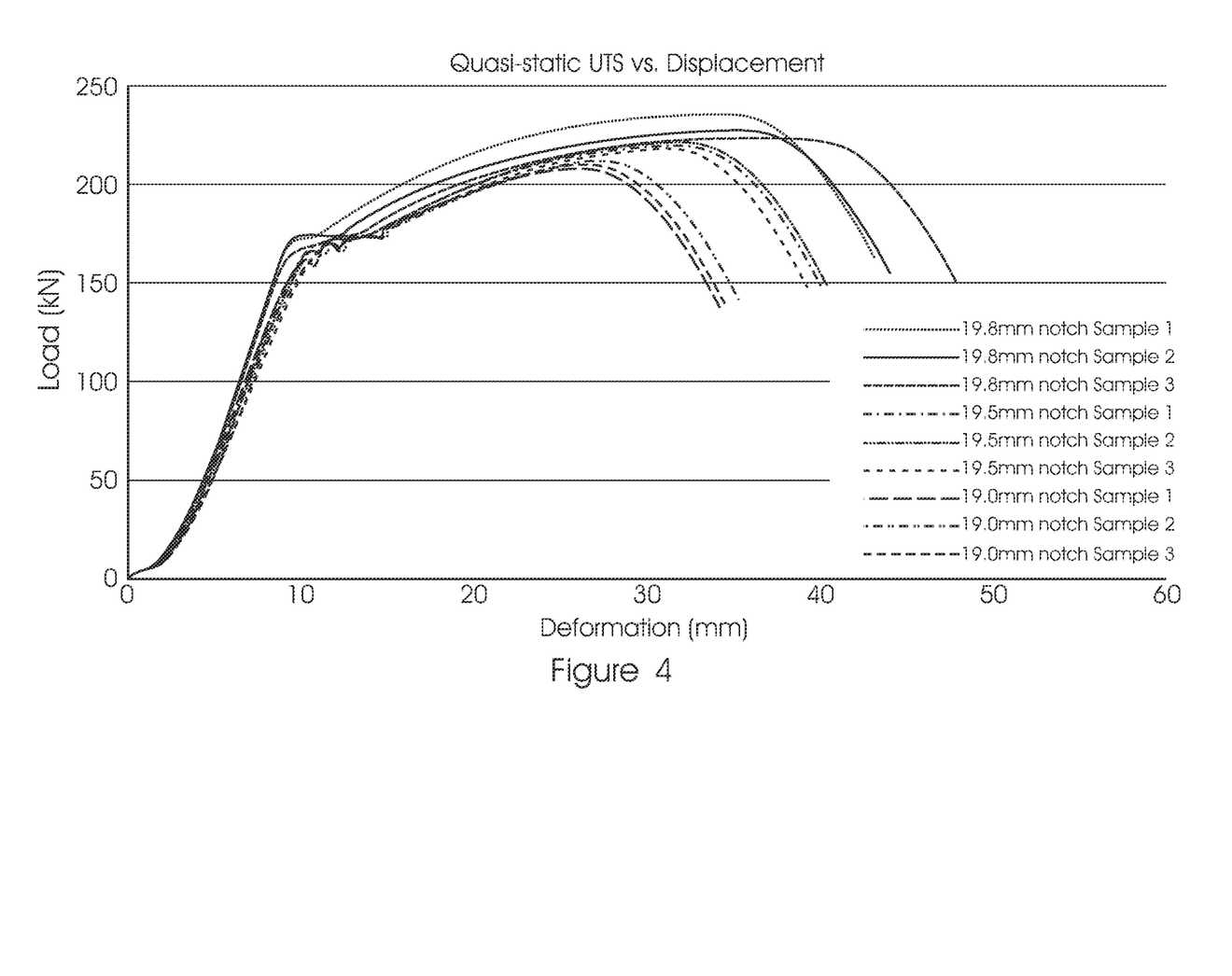
FIG. 4 is a graph showing load as displacement for a series of bars having different notch diameters.

A total of twelve quasi-static pull tests were conducted in the test, the results of which are presented in Table 1 and FIG. 4. These results are compared against the notchless control samples. The reduction in ultimate strength as tabulated below the notch diameter heading is an average value over the triplicates of each sample batch.

Figure 5:
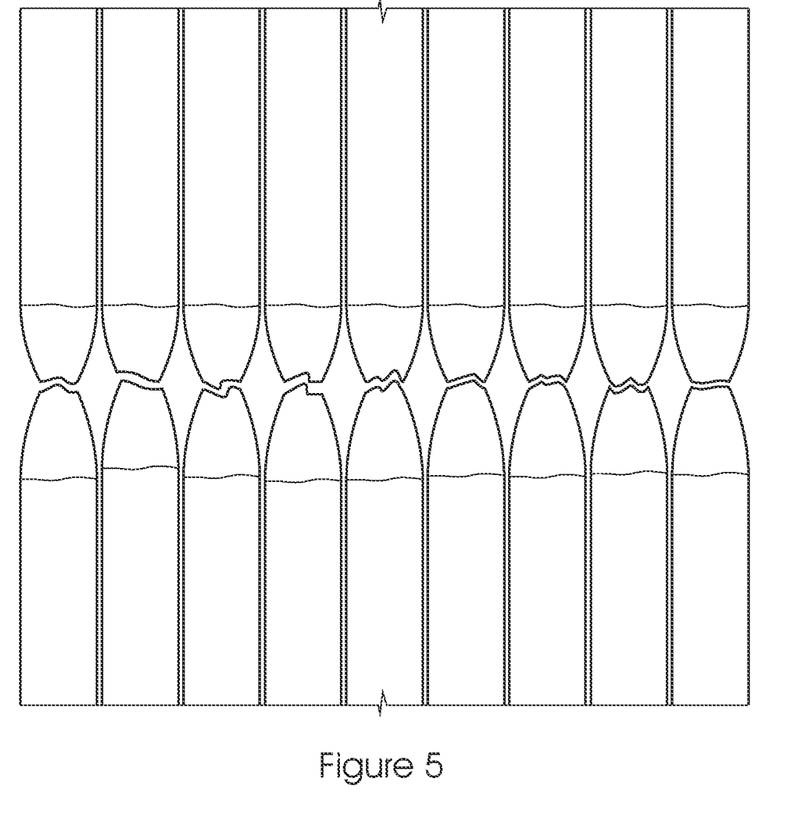
FIG. 5 is a photograph showing a series rock bolt bars that have severed in a ductile fracture manner.

Importantly, all tested samples achieved a ductile failure over the notch zone as per intended design (see FIG. 5), without a significant loss in ultimate tensile strength (UTS). The minimum guaranteed ultimate tensile strength specification for a 20 mm, 500 N bar is 210 kN. This value defines the minimum performance benchmark for the machined notch design. The quasi-static test suggests that the smallest permissible notch/minor diameter is 19 mm which produces an average bar UTS of 213 kN (see Table 1). A notch diameter smaller than this would result in a bar UTS of less than the minimum performance benchmark of 210 Kn.

TABLE 1

|  | 19.0 | 19.5 | 19.8 | 20.0 |
| --- | --- | --- | --- | --- |
| Sample 1 | 211.6 kN | 222.1 kN | 237.3 kN | 226.4 kN |
| Sample 2 | 213.0 kN | 222.6 kN | 228.3 kN | 227.6 kN |
| Sample 3 | 213.3 kN | 220.3 kN | 225.5 kN | 226.4 kN |
| Average | 213 kN | 222 kN | 230 kN | 227 kN |
| Loss in UTS | 94% | 98% | 100% | 100% |
| Result | Pass (>210 kN) | | | |

Figure 3A:
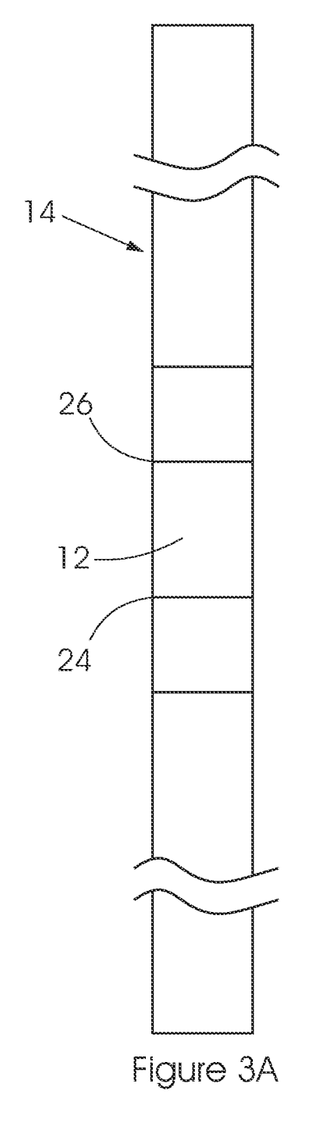
FIGS. 3A and 3B diagrammatically represent a bar with a failure zone, unloaded and placed under load respectively.
Figure 3B:
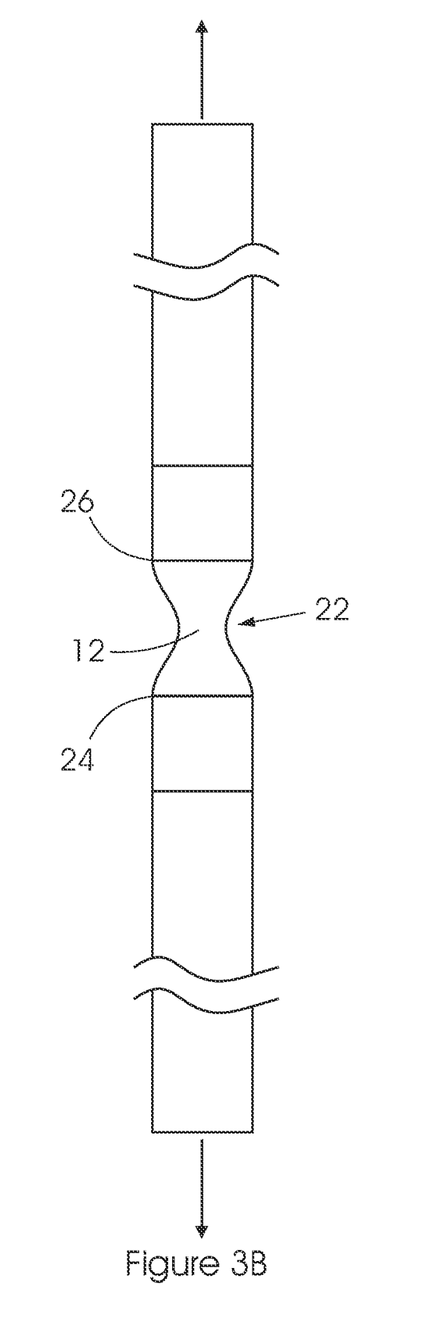

FIG. 3 illustrates that a reduction in notch diameter results in an overall bar deformation before failure, and therefore a reduction in dynamic energy absorption potential. For this reason and to preserve bar UTS, the notch diameter should be as large as possible whilst ensuring consistent failure over the machined zone.

Figure 6:
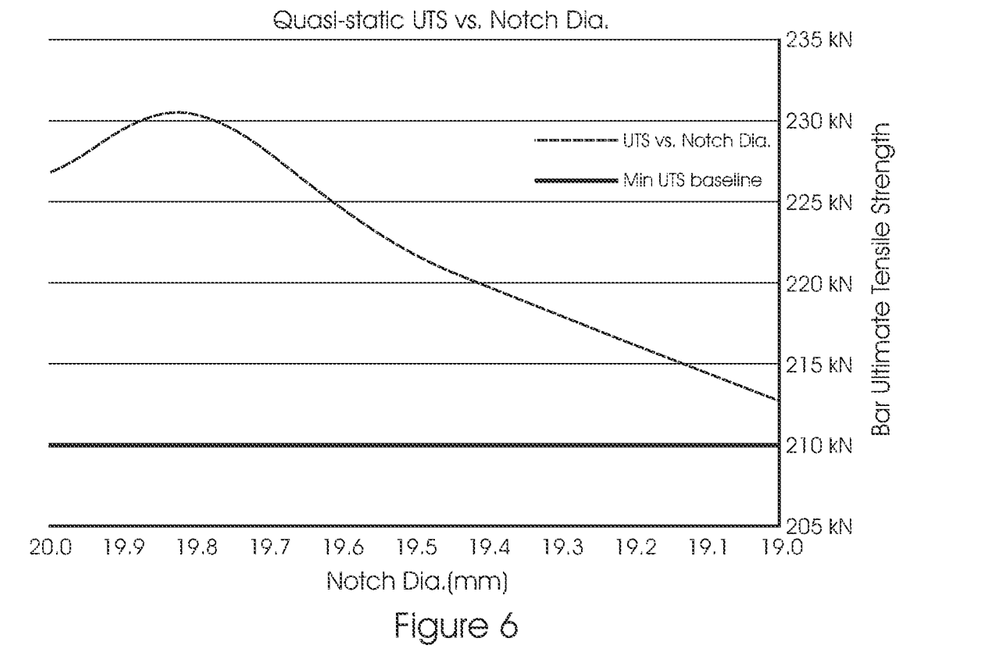
FIG. 6 is a graph showing the relationship between notch diameter and the tensile strengths of a bar under quasi-static conditions.

FIG. 6 graphically illustrates a reduction in bar UTS as the diameter of the machined notch is reduced. This allows the applicant to forecast the bar UTS for notch diameters not tested between the limits of ø20.0 mm to ø19.0 mm. The plot also compares the UTS of each notch against the minimum UTS specification offered with the 20 mm Vulcan bar.

Dynamic Testing

Test samples were subjected to a dynamic impact test. Each sample was a 20 mm×1100 with 100 mm of RD22 thread over each end bar, with a control sample (no notch) and three other samples (30 mm long notch) with a respective notch or minor diameter of 19.8 mm, 19.6 mm, 19.5 mm and 19.4 mm (tolerance of +/−0.03). The samples were prepared in triplicate. Each notch was machined into the bar at its centre.

Each bar thereafter was prepared and installed in the drop test machine for testing. Each bar was subjected to a 37.4 kJ energy impulse at 5.45 m/s.

Figure 7:
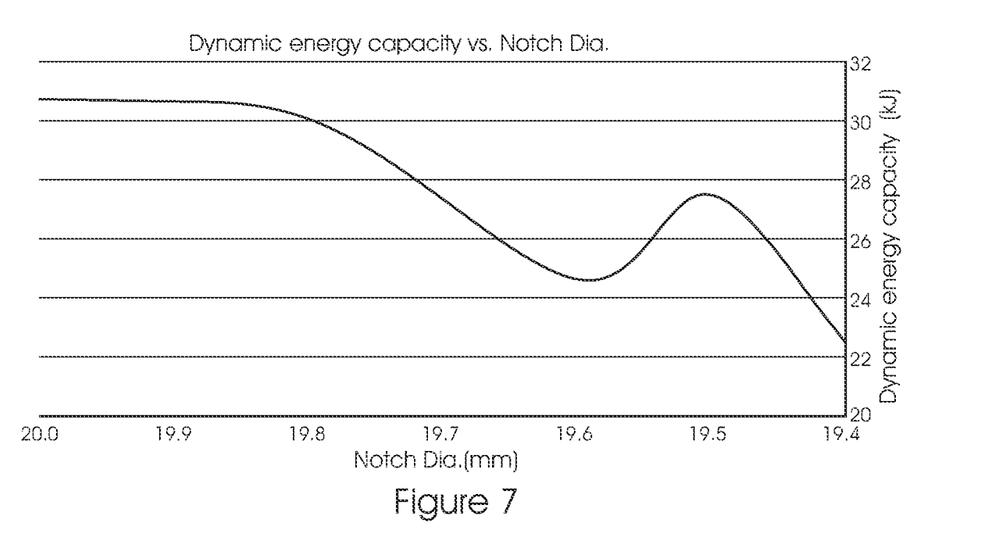
FIG. 7 is a graph showing the relationship between notch diameter and the dynamic energy capacity of a bar under dynamic load conditions.

A total of fifteen dynamic impact tests were conducted in this series. FIG. 7 illustrates a comparison of average energy absorption capacity against the notch diameter. Table 2 summarises the area or mode of failure for each test sample (one 19.8 mm sample was omitted due to incomplete data capture during testing).

The average energy absorption capacity of a standard 20 mm×1100 bar with a cold-rolled induced failure notch design, in accordance with the prior art, is 22.5 kJ. This value defines the minimum performance benchmark for the machined notch design.

TABLE 2

|  | Sample 1 | Sample 2 | Sample 3 |
| --- | --- | --- | --- |
| 20. × 30 mm (no notch) | Thread | Thread | Thread |
| 19.8 × 30 mm | Thread | Thread | N/A |
| 19.6 × 30 mm | Notch | Notch | Notch |
| 19.5 × 30 mm | Notch | Notch | Notch |
| 19.4 × 30 mm | Notch | Notch | Notch |

Figure 8:
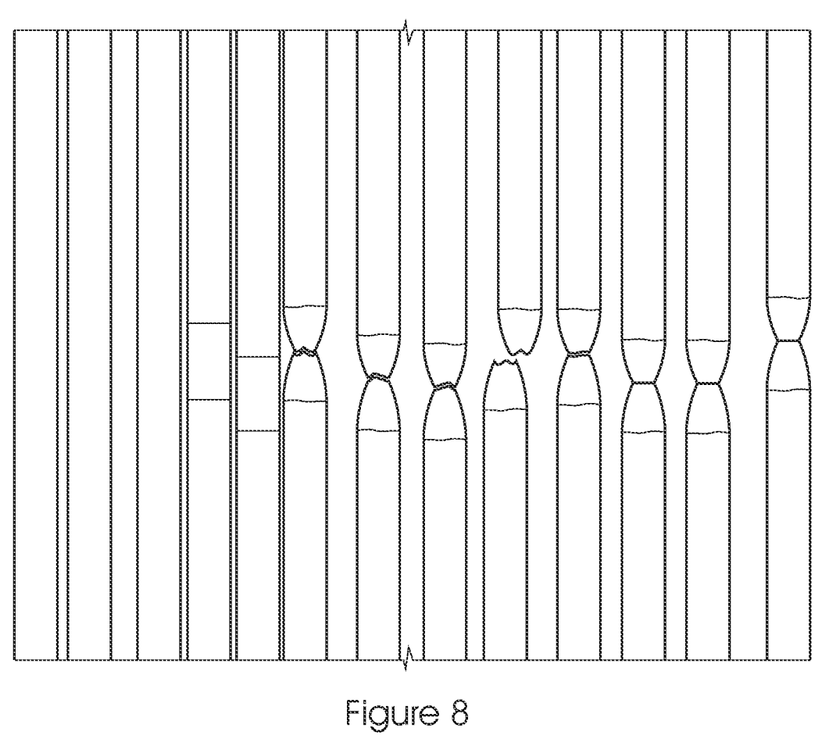
FIG. 8 is a photograph showing a series of rock bolt bars broken and unbroken after being subjected to load.

As shown in FIG. 8, all except one of the non-control test samples failed over the machined notch. The mode of failure was the formation of ductile necking over the machined zone, leading to a local reduction in the bar diameter and ultimate bar failure. The tests also show that a notch diameter of at least 19.6 mm (i.e. less 2% of the diameter of the 20 mm bar) is required to achieved consistent dynamic failure over the machined zone and that a minimum notch diameter of 19.4 mm is required to ensure the dynamic capacity of the bar is equal to or greater that minimum performance benchmark.

As part of this experiment, the applicant found that a minimum notch length of 30 mm for a 20 mm bar is required to ensure the ductile failure neck 22 does not meet changes in bar diameter or geometry, at notch boundaries 24 and 26. It was observed that when the ductile failure neck does meet changes in bar diameter or geometry, at the notch boundaries, inconsistency in break location and load return. Surprisingly, this minimum length of 30 mm holds true for bar diameters between 16 mm and 22 mm.

In summary, a bar having a machined notch in accordance with the invention is able to at least match the performance characteristics of the present cold-rolled notch method whilst offering improved failure zone consistency, design robustness and ease of bulk manufacture.

The invention claimed is:

1. A method of adapting a rock bolt to break in a predictable manner when subjected to sufficient tensile load, where the rock bolt comprises a metal bar with a proximal end and a distal end, a failure arrestor, and a sleeve enclosing at least a part of the bar, said sleeve including a failure arrestor element, the method comprising:
    forming a thread on a proximal end section of the bar, adapted to engage with the failure arrestor,
    removing material from the bar in a circumferential band between the distal end and the thread, the band having a length which is 10 mm to 45 mm, to reduce a diameter of the bar within the band to a minor diameter which is 0.5% to 5% less than the diameter of the bar, thereby to provide a failure zone within which the bar is configured to break to ensure that a section of the bar to which the failure arrestor is engaged is restrained by engagement with the failure arrestor element of the sleeve.

2. The method according to claim 1, wherein the failure zone has a length in a range 25 mm to 35 mm.

3. The method according to claim 2, wherein the failure zone has a length in a range 30 mm to 35 mm.

4. The method according to claim 3, wherein the minor diameter is consistent within the band.

5. The method according to claim 3, wherein the diameter of the bar is in the range 16 mm to 25 mm.

6. The method according to claim 2, wherein the minor diameter is consistent within the band.

7. The method according to claim 2, wherein the diameter of the bar is in the range 16 mm to 25 mm.

8. The method according to claim 1, wherein the minor diameter is consistent within the band.

9. The method according to claim 1, wherein the minor diameter is 1% to 4% less than the diameter of the bar.

10. The method according to claim 9, wherein the minor diameter is 2% to 3% less than the diameter of the bar.

11. The method according to claim 1, wherein the diameter of the bar is in the range 16 mm to 25 mm.

12. The method according to claim 1, wherein the material is removed by a subtractive manufacturing process.

* * * * *